United States Patent

[11] 3,584,848

| [72] | Inventors | Kazuo Kiyonaga<br>Newark;<br>Peter Wrampe, Edison, both of, N.J. |
|------|-----------|------|
| [21] | Appl. No. | 826,392 |
| [22] | Filed | May 21, 1969 |
| [45] | Patented | June 15, 1971 |
| [73] | Assignee | Union Carbide Corp.<br>New York, N.Y. |

[54] METHOD AND APPARATUS FOR PRODUCING CEMENT CLINKER
6 Claims, 5 Drawing Figs.

[52] U.S. Cl............................................. 263/21,
34/57
[51] Int. Cl.............................................F26b 17/00,
F27b 15/00
[50] Field of Search............................................. 263/21 A,
53; 34/57 E

[56] References Cited
UNITED STATES PATENTS

| 729,009 | 5/1903 | Sutton et al. | 263/21 A |
| 2,184,300 | 12/1939 | Hodson et al. | 263/21 AX |
| 3,135,588 | 6/1964 | Helming | 34/57 E |
| 3,140,862 | 7/1964 | Schoppe | 263/21 A |

Primary Examiner—John J. Camby
Attorneys—Paul A. Rose, Thomas I. O'Brien, Lawrence G. Kastriner and Harrie M. Humphreys ABSTRACT: Cement-forming raw materials are introduced into a swirling stream of hot gas in a cylindrical reaction zone where the raw materials react to form clinkers and where the gas stream holds the clinker particles in suspension until the particles grow heavy enough to drop to the lower portion of the reaction zone. Apparatus suitable for carrying out the process is also described.

PATENTED JUN 15 1971

INVENTORS
KAZUO KIYONAGA
PETER WRAMPE
BY Harrie M. Humphreys
ATTORNEY

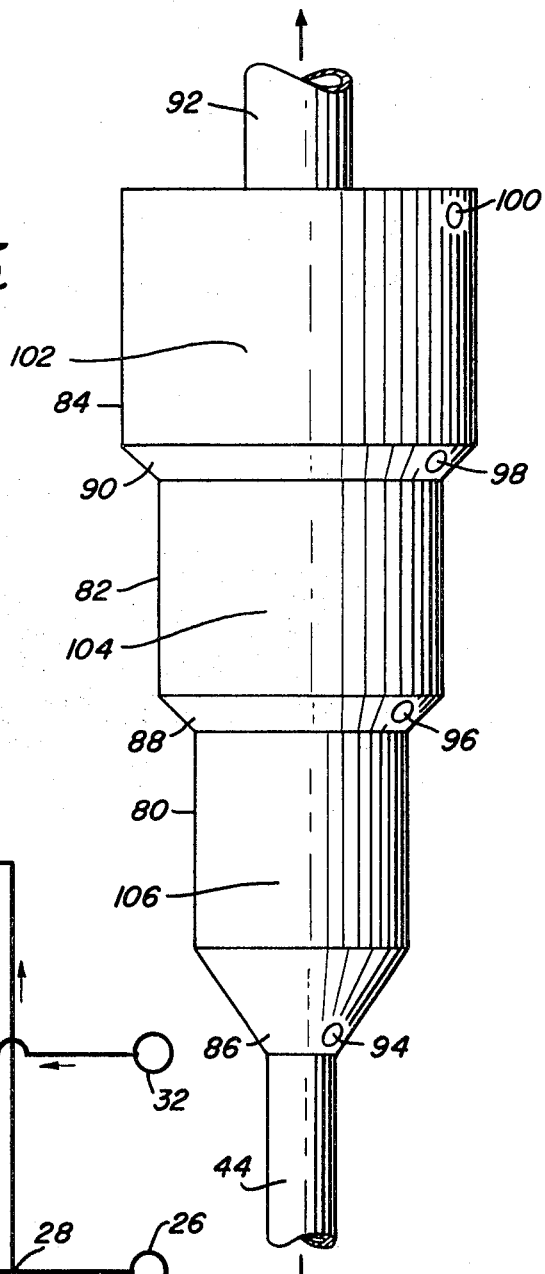

METHOD AND APPARATUS FOR PRODUCING CEMENT CLINKER

BACKGROUND

This invention relates to the production of cement. More particularly, the invention is directed to an improved process for the production of cement clinker and to apparatus useful in carrying out the improved process.

Many processes for the production of cement have previously been proposed and several such processes have found considerable use in the commercial production of cement and cement products.

Portland cement is made by calcining and then clinkering cement-forming raw materials which typically consist of limetone, silica, kaolin, hematite, an magnesium carbonate. The primary chemical reaction during calcining is dissociation of the carbonates into oxides, while clinkering (which is carried ut at considerably higher temperatures than the calcination) results in the formation of certain mineral phases from the oxides. The clinkers, together with gypsum, are then ground to produce the final cement product.

A typical prior art method for manufacture of cement, including a description of a variety of conventionally used cement-forming raw materials, is described in U.S. Pat. No. 3,074,707. This patent also discloses and claims a method for manufacturing Portland cement in a rotary kiln.

SUMMARY OF THE INVENTION

This comprises a process for producing cement clinker comprising the steps of:
1. providing a reaction zone of generally upright cylindrical shape such that the area of a horizontal cross section of the reaction zone taken at any selected point between the lowest and highest points in the reaction zone is the same as or larger than the area of a horizontal cross section taken at any point lower than the selected point,
2. introducing tangentially into or forming by combustion of a fuel and an oxidant in the reaction zone at a point in the lower portion thereof at least one stream of hot gas at a temperature sufficiently high to cause clinkering of cement-forming raw materials,
3. directing said stream of hot gas circumferentially around the periphery of said reaction zone so that it forms a generally upwardly spiralling helical stream which is removed from said reaction zone near the upper portion thereof,
4. introducing cement-forming raw materials into said hot gas stream in the reaction zone at a point no lower than the lowest point of introduction or formation of the hot gas stream,
whereby the cement-forming raw materials react to form clinkers and whereby the centrifugal force of the gas stream maintains the clinker particles in suspension until the particles grow to sufficient size so that their weight is sufficient to overcome the upward component of force of the hot gas stream and the clinker particles drop to the portion of said reaction zone below the lowest point of introduction or formation of said hot gas stream.

The apparatus of this invention comprises:
1. a generally upright cylindrical reactor such that the area of a horizontal cross section of the reactor taken at any selected point between the lowest and highest points in the reactor is the same as or larger than the area of a horizontal cross section taken at any point lower than the selected point;
2. at least one means disposed in the lower portion of the reactor for tangentially introducing into or forming in the rector at least one stream of hot gas and for directing said stream of hot gas circumferentially around the periphery of said reactor;
3. at least one gas outlet means in said reactor disposed above said gas inlet means;
4. at least one means for introducing cement-forming raw materials into the reactor disposed at the same level or above the lowest of the hot gas introducing or forming means; and
5. means disposed below the lowest of the gas introducing or forming means for removing cement clinker from said reactor.

THE DRAWINGS

FIG. 4 ad FIG. 5 are schematic representations of two additional embodiments of the apparatus of this invention.

DETAILED DESCRIPTION OF THE INVENTION

In a preferred form of the apparatus of this invention, the reactor comprises two or more right circular cylindrical sections disposed one above the other, the lowest of the right circular cylindrical sections having the smallest diameter and the diameter of each right circular cylindrical section being larger than the diameter of the next lowest right circular cylindrical section, the right circular cylindrical sections being connected to each other or to the cement clinker removal means, as the case may be, by frustoconical sections such that the conical sections and cylindrical section form a continuous reactor shell; and the means for introducing into or forming hot gas in the reactor and for introducing cement-forming raw materials into the reactor are disposed near the conical sections below each cylindrical section, except that additional gas introduction or forming means and/or raw material introducing means may be disposed along any of the cylindrical sections.

The process of this invention has two principal embodiments. In the first principal embodiment the cement-forming raw materials are calcined prior to being fed into the reaction zone where the clinkering reaction takes place. In the second principal embodiment, the cement-forming raw materials are fed directly into the reaction zone without prior calcining, and the calcining and clinkering reactions both take place within the reaction zone.

Figure 1:
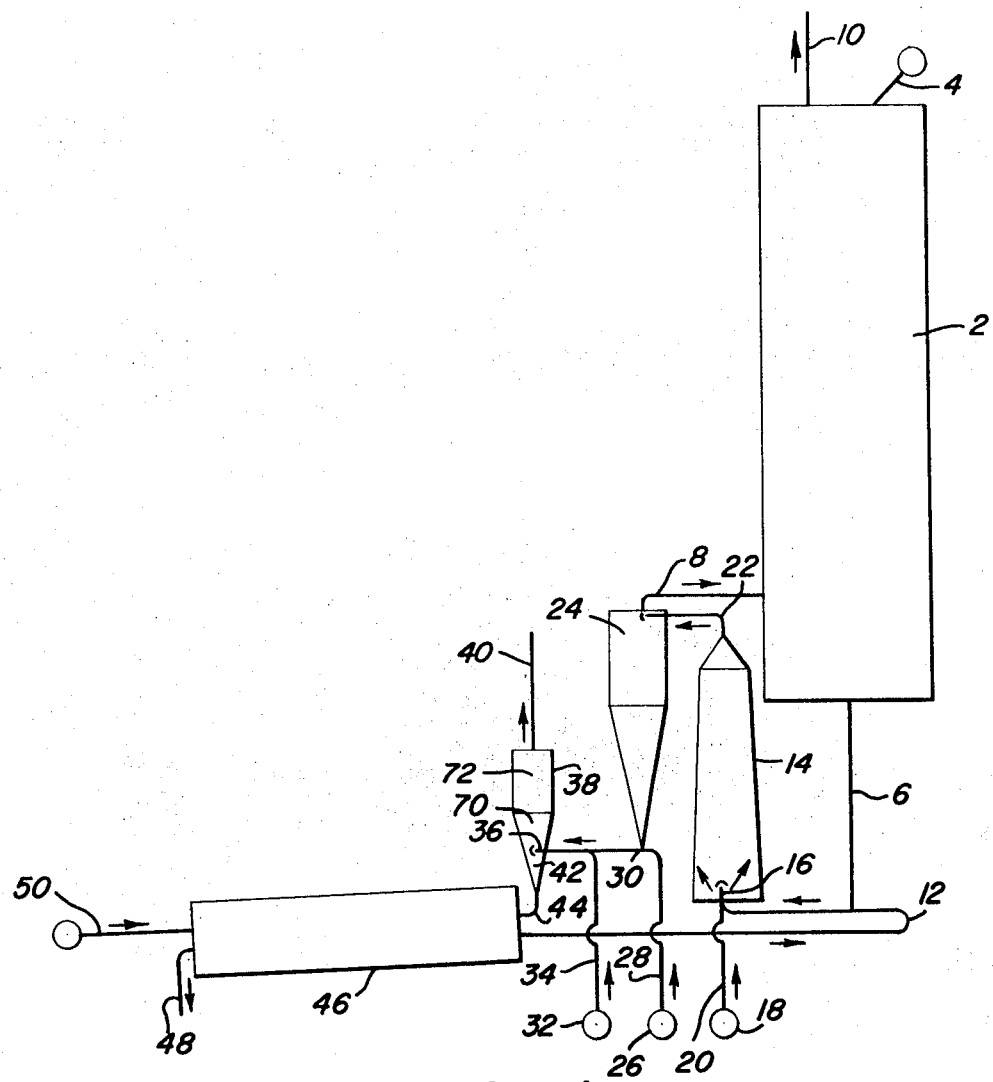
FIG. 1 is a schematic representation of one embodiment of the process of this invention and of an apparatus suitable for carrying out the invention.

The first principal embodiment of the process of this invention employing separate calcining and clinkering steps and a typical embodiment of the apparatus of this invention are illustrated by FIG. 1. In FIG. 1, element 2 represents a unit for preheating the cement-forming raw materials. Ground and mixed cement-forming raw materials enter the preheater through conduit 4 and leave the preheater through conduit 6. Hot gases (produced as described in more detail hereinbelow) enter the preheater through conduit 8 and leave through conduit 10. The preheater 2 can be of any convenient construction, for example, a multistage suspension preheater in which the cement-forming raw materials are carried by gravity, counter current to the stream of hot gases.

The preheated cement-forming materials are fed by conduit 6 into a stream of high-velocity oxidant gas, (for example, oxygen, air or oxygen-enriched air) flowing through conduit 12 and enter the lower portion of calcination reactor 14 through conduit 16 A combustible fuel (for example, natural gas, methane, fuel oil, coal or liquid petroleum gas) from source 18 is also fed into calcination reactor 14 through conduits 20 and 16 where the fuel and oxidant are burned to produce hot combustion gases which, in turn, cause calcination of the cement-forming raw materials. The stream of hot combustion gases carries the calcined cement-forming raw materials out the top of calcination reactor 14 through conduit 22 and into separator 24, typically a cyclone separator, where the calcined raw materials drop to the bottom of separator 24 and the hot combustion gases are fed into preheater 2 through conduit 8. The fuel and oxidant employed in the calcination step are selected to provide hot combustion products having temperatures in the order of 2,500° F. to 4,500° F. which is a sufficiently elevated temperature to heat the solid raw materials to 1,400° F. to 1,800° F. and cause calcination of the raw materials.

The cement-forming raw materials can be fed to preheater 2 in either wet or dry form, the choice depending upon the type of preheater and the particular raw materials employed.

Gaseous fuel from source 26 is fed through conduit 28 and calcined raw materials from separator 24 enter the fuel gas stream at inlet 30. Oxidant gas from source 32 flows through conduit 34 and the mixture of fuel gas, oxidant gas and calcined cement-forming raw materials is introduced through inlet 36 tangentially and at a slightly upward angle into the clinker reactor 38. The fuel gas and oxidant gas are burned within clinker reactor 38 to produce a high velocity stream of hot combustion gases which spirals helically upward through clinker reactor 38 and exits through gas outlet duct 40 at the top of reactor 38. Gas outlet duct 40 is generally constructed so as to protrude down inside of reactor 38 several inches to aid in separation of the exiting gas stream from the solid cement-forming raw material. The particles of calcined raw materials are held in suspension by the force of the upwardly spiraling combustion gases. As the clinkering reaction takes place, the particles of clinker grow larger in size until their weight is sufficient to overcome the upward force of the hot combustion gas stream and the heavy clinker particles drop to the lower portion 42 of clinker reactor 38.

The clinkers from the lower portion of reactor 38 are removed through conduit 44 into clinker cooler 46, where the clinkers traverse the length of cooler 46 and are collected at 48. The hot clinkers are cooled by means of a counter current flow of oxidant gas 50 which is heated by passing over the clinkers in cooler 46 and is subsequently passed through conduit 12 and used in the calcination step as described hereinabove. The fuel and oxidant employed in the clinker reactor must be of such nature and of such quantity as to produce hot combustion products having a temperature high enough to heat the solid materials to at least 2,200° F. or above, this being the minimum temperature at which the clinkering reaction will generally take place. Combustion product temperatures in the range of 3,000° F. to 5,000° F. are usually employed in the clinker reactor.

For use in the calcination reacotr 14, preferred fuels are natural gas, oil and coal and a preferred oxidant is air, since these combinations are readily obtainable and provide gaseous combustion products of sufficiently elevated temperature to cause calcination f the feed raw materials. Also, air provides a high-volume coolant for clinker cooler 46, and the passage of air through the clinker cooler is a convenient method of preheating the air prior to combustion in the calcination reactor.

For use in the clinker reactor 38, natural gas is a preferred fuel and oxygen and oxygen-enriched air are preferred oxidants, since the use of these oxidants provides a higher temperature flame and therefore higher temperature combustion products which can promote rapid heat transfer to accelerate the clinkering reaction of the cement-forming raw materials.

The high temperatures attained by the hot gas streams and the efficient and times mixing achieved by the swirling of the suspended solid materials provide good heat transfer to the solid materials and therefore fast reaction. For example, calcination can take place in as little as 4 seconds and clinkering in as little as 5 seconds depending, of course, on such factors as gas temperature, particle size, raw materials, and the like. It is preferable to keep the solid materials swirling for at least the ties noted in the preceding sentence in order to provide sufficient time for heat transfer and for the clinker particles to become of large enough size to drop to the bottom of the reactor. The TIMES noted above can be somewhat longer, thus making it possible to use lower flame temperatures and maintain closer control of the reaction.

In the embodiment of this invention shown in FIG. 1, the fuel, oxidant, and feed materials are introduced into the clinker reactor 38 through a single inlet 36, although there are many alternative ways of introducing fuel, oxidant and feed materials into the clinker reactor which fall within the scope of the present invention. The particular location and number of inlets for the various materials in the clinker reactor depend upon a variety of factors, such as the size and geometry of the reactor, the particular fuel and oxidant employed, the particular cement-forming materials employed, and whether o not the feed materials are calcined before entering the clinker reactor. The most efficient arrangement can easily be determined by one skilled in cement production technology based on the discussion of the subject process herein.

To illustrate the variety of apparatus suitable for carrying out the process of this invention, one or more separate inlets for fuel, one o more separate inlets for oxidant, and one or more separate inlets for feed materials can be employed, provided that the arrangement is such that at least one stream of tangentially directed hot combustion products is introduced into or formed in the reactor at a point in the reactor no higher than the lowest inlet for cement-forming feed materials. A gas outlet means, such as means 40, is preferably located near the center of the top of the clinker reactor and can comprise, for example, a single relatively large opening or a cluster of smaller openings. The inlet means for the cement-forming raw materials are preferably disposed so that the raw materials are introduced into the reactor tangentially and in the same direction as the fuel and oxidant (or hot gas) streams.

When two means for forming or introducing streams of hot gases at two different levels are employed, the swirling mass of suspended solid materials tends to be isolated in the area between the two gas forming or introducing means. Similarly, when three or more gas forming or introducing means at different levels are employed, the swirling mass of suspended solid material tends to be located in two or more bands, one band located generally between each two adjacent gas-forming or -introducing means.

The means for introducing hot gas or introducing gases which burn in the reactor are located so that the gas streams are injected tangentially, and the resulting gas flow is generally around the periphery o the reaction zone; that is, the flow spirals upward around the inner circumference of the reactor. A net upward flow of gas is obtained since the gas outlet means is located toward the top of the reactor and the gas flows are generally upward. The bottom portion of the clinker reactor where clinker product is removed is preferably provided with a conventional gas seal, such as a rotary or cone valve, so that the principal exit for gaseous products is the outlet means located near the top of the reactor.

The lowest means for forming or introducing hot gas streams is preferably inclined upwardly from the horizontal plane, preferably at an upward angle of less than 10°, while any additional gas inlet means located above the lowest mean are preferably directed in the horizontal plane.

The lowest means for forming or introducing hot gas streams is the most important in controlling particle size of the cement clinker, since the lowest stream is primarily responsible for forcing unreacted particles of cement-forming raw materials or undersized clinker particles back into the main portion of the reactor and into contact with the swirling hot gases.

Figure 2:
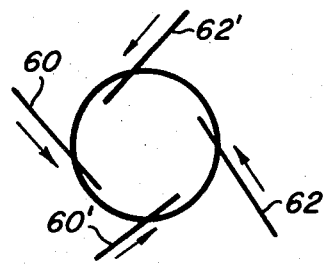
FIG. 2 and FIG. 3 are schematic views of an apparatus of the type shown in FIG. 1 taken along a horizontal cross section of the apparatus and illustrate other embodiments of this invention.
Figure 3:

FIGS. 2 and 3, which are horizontal cross-sectional views of the clinker reactor at a level where gases are injected into the reactor, illustrate alternative embodiments for introducing hot gas or fuel, oxidant, or mixtures thereof into the clinker reactor. In FIG. 2, for example, fuel can be introduced through conduit 60, and oxidant through conduit 62, and the separate gases will then mix and burn in the clinker reactor. Note that both conduits 60 and 62 introduce the gas streams tangentially into the reactor. Both conduits 60 and 62 may be inclined so that the gases are introduced at a lightly upward angle to the horizontal plane. Alternatively, a mixture of fuel and oxidant can be introduced through each of conduits 60 and 62. Additional inlets such as 60' and 62' can also be used.

In the arrangement of FIG. 3, fuel can be introduced through one of conduits 64 or 66 and oxidant through the other of conduits 64 or 66 or, alternatively, a mixture of fuel and oxidant can be introduced through each of conduits 64 and 66. Additional inlets such as 64' and 66' can also be used.

In the embodiment shown in FIG. 1, the clinker reactor has a tapered lower portion 70 and a right circular cylindrical upper portion 72. In alternative structures, the clinker reactor can have, for example, a right conical shape, the shape of a slightly tapered circular cylinder, or of a tapered cylinder having an elliptical cross section. The exact choice of clinker reactor shape depends on the variety of factors noted above in connection with the various operable arrangements of fuel, oxidant and raw material inlets.

FIG. 4 illustrates an alternative structure for clinker reactor 38 shown in FIG. 1. Element 74 in FIG. 4 is a source of cement-forming raw materials such as separator 24 of FIG. 1. In FIG. 4, fuel gas conduit 28 has three branches which introduce fuel gas tangentially into the clinker reactor at inlets 36, 36', and 36". Cement-forming raw materials from source 74 enter conduit 28 at inlet 30 and are introduced into the reactor with the fuel gas stream at inlet 36. Oxidant gas conduit 34 has three branches which introduce oxidant gas tangentially into the reactor through inlets 36, 36', and 36". The production of cement clinker in clinker reactor 38 of FIG. 4 is generally the same as that described for clinker reactor 38 in FIG. -, except that fuel and oxidant are supplied at three points through separate fuel and oxidant inlets, and cement-forming raw materials are supplied in the fuel gas stream at the middle of the three inlets.

A preferred form of the clinker reactor apparatus, shown in FIG. 5, consists of two or more interconnected cylindrical sections 80, 82 and 84 of different diameters, stacked one on top of the other with the smallest diameter section at the bottom and progressively larger diameter sections above it. The bottom of the smallest diameter section is connected to a conical section 86 similar to that found in conventional cyclones, and each of the other cylindrical sections above are connected to each other by frustoconical sections, 88 and 90. The top of the largest diameter section is capped with a roof through the middle of which a gas discharge opening 92 is provided. A selected number of tangential gas-injection ports 94, 96, 98 and 100 are provided along the length of the interconnected cylindrical sections. One or more of these ports, preferably not the lowest port, may be used to inject the solid cement-forming raw materials. Near the bottom of the lowest conical section, at least one tangential gas port 94 is provided to inject hot combustion gases or gases which combust within the chamber.

A typical embodiment of the apparatus of FIG. 5 operates in the following manner: Ground and mixed cement-forming raw materials, preferably precalcined, are injected tangentially into the reactor through port 100 with fuel gas and/or oxidant gas as the carrying fluid. As the solids and gas swirl around the circumference of reaction zone 102, some of the particles tend to drop gradually to the lower section of this zone. The shallow frustoconical section 90, acting as a shelf, interrupts the fall of these particles which are then quickly caught by the swirling action of hot gases from tangential gas port 98 and returned to zone 102. As the particles begin to grow as a result of clinkering, they overcome the upward force of the gases and drop into reaction zone 104. Again, the particles swirl around the periphery of zone 104 with the hot gases while clinkering reactions occur. Any particles which drop off are caught on frustoconical section 88 and are swept back to reaction zone 104 by hot gases emating tangentially from port 96. As the particles again grow larger, they enter reaction zone 106 and are kept in circumferentially swirling motion by the tangentially injected hot gases from port 94. Finally, as the particles reach the desired size and weight, they drop off the bottom frustoconical zone 86 through conduit 44.

As the solid reacting particles move from the upper to the lower reaction zones, there is a constant upsweeping of the smaller unreacted particles, thereby minimizing carryover of unreacted solids with the clinker product. Since the net overall gas flow is upward, the increasing diameters of the successively higher reaction zones compensate for the increasing volumes of hot gases traversing the reactor, and thus maintain the net upward gas velocity reasonably constant throughout the reaction zones.

The process of the present invention has a number of advantages over cement production processes heretofor known. An advantage of the embodiment wherein precalcined raw materials are introduced into the clinker reactor is that the hot gaseous products which pass through the clinker reactor serve not only to promote the clinkering reactions but also to carry off (in vapor form) substantial amounts of alkali metals, alkali metal compounds, sulfur or sulfur compounds which may be present in the cement-forming raw materials, these ingredients being generally undesirable in the finished cement product.

Another advantage of the process of this invention is that the clinker particles which form and drop to the bottom of the clinker reactor are generally of smaller size and of relatively uniform size as compared with the clinker particles produced by other processes. It is believed that the uniformity of the clinker particles results from the fact that the hot gas stream follows a slightly upwardly directed tangential path from the bottom toward the top of the clinker reactor without significant reverse flow from the top toward the bottom of the reactor. Thus, the clinker particles, as they form, are more or less uniformly suspended in the clinker reactor, become gradually heavier, and finally drop to the bottom of the reactor at about the same size and weight.

Another advantage of the process of this invention is that the clinker reactor can be of relatively small size (compared to reactors presently used) because of the fast reaction rates and short residence time of materials introduced into the reactor.

Still another advantage of the process of this invention is that the raw materials used can be more coarsely ground than in prior processes so that dust losses with related air pollution problems are kept to a minimum.

A still further advantage of the process of this invention is that it is flexible and can be adapted to handle a wide variety of cement-forming raw materials. As an example of this flexibility, the precess of this invention can be used for the production of white cement (that is, cement free from significant quantities of ferric iron) since the process can use a closed system which can provide a reducing atmosphere in the clinkering and cooling steps.

The following example further illustrates the embodiment of the process of this invention previously discussed with reference to FIG. 1. Calculated weights of dry raw material required to produce one barrel of clinker are shown in the following table:

TABLE I

| Dry raw materials: | Weight, /lbs.bbl. |
| --- | --- |
| $CaCO_3$ | 429.0 |
| $SiO_2$ | 59.6 |
| $Al_2O_3 \cdot 2SiO_2 \cdot 2HO_2$ | 49.6 |
| $Fe_2O_3$ | 10.2 |
| $MgCO_3$ | 23.6 |
| Other | 11.7 |
| Total | 583.7 |

Ground raw feed first enters the top stage of a four-stage suspension preheater where it is contacted stagewise in countercurrent fashion with hot effluent gases from the calciner. The preheated solids are then fed to a slightly tapered cylindrical reactor which is essentially a solids-gas transport device in which calcination takes place Heat is supplied by combustion of natural gas with preheated air and reaction is about half completed in the 2 seconds that it takes to convey the solid particles upward through the reactor. The solids-gas mixture is then separated in a cyclone separator which also acts to provide an additional 2 to 3 seconds residence time before settling during which time uncalcined material decomposes. Hot effluent gases are sent to the preheater unit. The calcined hot powder is then fed tangentially into a cyclonic reactor with combusted natural gas and oxygen. Centrifugal force keeps the injected solids around the walls of the reactor in direct contact with the swirling gases and in intimate contact with other solid particles with which they react to form clinker. Heating of the solid particles to reaction temperature and time for reaction requires only a few seconds in view of the high temperature to which the particles are exposed. As the clinker particles grow, gravity causes them to slowly drop off from the reaction zone to the bottom from which the clinkers are removed. Hot clinker of fairly uniform size is then dropped into a small rotary cooler where, in direct contact with incoming air, it is cooled to about 300° F. The preheated air is sent to the bottom of the calciner. The hot flue gas from the clinker reactor contains sulfur dioxide and volatilized alkalies (such as $Na_2O$, $K_2O$) which are undesirable in clinker and is therefore vented to the stack.

The composition of a typical clinker product obtained using the feed materials of table I is shown below in table II.

TABLE II

| Mineral phase in a typical clinker: | Weight, lbs./bbl. |
|---|---|
| $3CaO \cdot SiO_2$ | 204.2 |
| $2CaO \cdot SiO_2$ | 83.0 |
| $3CaO \cdot Al_2O_3$ | 34.7 |
| $4CaO \cdot Al_2O_3 \cdot Fe_2O_3$ | 31.1 |
| MgO | 11.3 |
| Other | 11.7 |
| Total | 376.0 |

What we claim is:

1. A process for producing cement clinker which comprises the steps of:
   1. providing a reaction zone of generally upright cylindrical shape such that the area of a horizontal cross section of the reaction zone taken at any selected point between the lowest and highest points in the reaction zone is the same as or larger than the area of a horizontal cross section taken at any point lower than the selected point,
   2. introducing tangentially into or forming by the combustion of a fuel and an oxidant in said reaction zone at a point in the lower portion thereof at least one stream of hot gas at a temperature sufficiently high to cause clinkering of cement-forming raw materials,
   3. directing said stream of hot gas circumferentially around the periphery of said reaction zone and removing said stream of hot gas from said reaction zone near the upper portion thereof, said hot gas forming a generally upwardly spiralling helical stream without significant reverse flow from the upper portion toward the lower portion of said reaction zone,
   4. introducing cement-forming raw materials into said hot gas stream in said reaction zone at a point no lower than the lowest point of introduction or formation of said hot gas stream,
   whereby said cement-forming raw materials react to form clinkers and whereby the centrifugal force of said gas stream maintains the clinker particles in suspension until said particles grow to sufficient size so that their weight is sufficient to overcome the upward component of force of said hot gas stream and said clinker particles drop to the portion of said reaction zone blow the lowest point of introduction or formation of said hot gas stream.

2. The process is accordance with claim 1 wherein said cement-forming raw materials are calcined prior to introduction into said reaction zone.

3. The process in accordance with claim 1 wherein at least two streams of hot gas are introduced or formed in said reaction zone at at least two different levels.

4. The process in accordance with claim 3 wherein the lowest of said gas streams is directed upwardly from the horizontal at an angle of less than 10°.

5. Apparatus suitable for the production of cement clinker which comprises:
   1. a generally upright cylindrical reactor such that the area of a horizontal cross section of said reactor taken at any selected point between the lowest and highest points in the reactor is the same as or larger than the area of a horizontal cross section taken at any point lower than the selected point;
   2. at least one means disposed in the lower portion of said reactor for tangentially introducing into or forming in said reactor at least one stream of hot gas and for directing said stream of hot gas circumferentially around the periphery of said reactor;
   3. at least one gas outlet means in said reactor disposed above said gas inlet means;
   4. at least one means for introducing cement-forming raw materials into said reactor disposed at the same level or above the lowest of said hot gas introducing or forming means; and
   5. means disposed below the lowest of said gas introducing or forming means for removing cement clinker from said reactor;
   6. said reactor comprising two or more right circular cylindrical sections disposed one above the other, the lowest of said right circular cylindrical sections having the smallest diameter and the diameter of each right circular cylindrical section being larger than the diameter of the next lowest right circular cylindrical section, said right circular cylindrical sections being connected to each other or to said cement clinker removal means, as the case may be, by frustoconical sections such that said frustoconical sections and right circular cylindrical sections form a continuous reactor shell; and said means for introducing or forming hot gas in said reactor and for introducing cement-forming raw materials into said reactor being disposed near the frustoconical sections below each right circular cylindrical section, except that additional gas introduction or forming means and/or cement-forming raw material introducing means may be disposed along said right circular cylindrical sections.

6. Apparatus in accordance with claim 5 wherein said gas introducing or forming means are located in said frustoconical sections and said cement-forming raw material introducing means is located near the top of the uppermost of said right circular cylindrical sections.

PO-1050
(5/69)

UNITED STATES PATENT OFFICE
CERTIFICATE OF CORRECTION

Patent No. 3,584,848      Dated June 15, 1971

Inventor(s) K. Kiyonaga et al.

It is certified that error appears in the above-identified patent and that said Letters Patent are hereby corrected as shown below:

In col. 1, line 31, after this word "This" insert --invention--; line 71, "rector" should read --reactor--.

Col. 2, line 33, "section" should read --sections--; line 66, insert a period after the number "16".

Col. 3, line 47, "reacotr" should read --reactor--; line 51, "f" should read --of--; line 63, "times" should read --intimate--; line 70, "ties" should read --times--.

Col. 4, line 10, "o" should read --or--; line 17, "o" should read --or--; line 43, "o" should read --of--; line 72, "lightly" should read --slightly--.

Col. 5, line 27, "Fig. --," should read --Fig. 1,--; line 67, "emating" should read --emanating--.

Col. 6, line 42, "precess" should read --process--; line 70, insert a period after the word "place".

Col. 7, line 6, after the word "swirling" insert --hot--.

Col. 8, line 5, "blow" should read --below--.

Signed and sealed this 28th day of December 1971.

(SEAL)
Attest:

EDWARD M. FLETCHER, JR.      ROBERT GOTTSCHALK
Attesting Officer             Acting Commissioner of Patents